(12) United States Patent
Sones

(10) Patent No.: US 7,262,779 B1
(45) Date of Patent: Aug. 28, 2007

(54) DIFFERENTIAL IMAGING COLORIMETER

(75) Inventor: Richard A. Sones, Cleveland, OH (US)

(73) Assignee: Applied Vision Company, LLC, Cuyahoga Falls, OH (US)

( * ) Notice: Subject to any disclaimer, the term of this patent is extended or adjusted under 35 U.S.C. 154(b) by 1057 days.

(21) Appl. No.: 10/411,741

(22) Filed: Apr. 10, 2003

(51) Int. Cl.
- G09G 5/02 (2006.01)
- G06K 9/00 (2006.01)
- H04N 17/00 (2006.01)
- H04N 9/73 (2006.01)
- G06K 9/62 (2006.01)
- H04N 17/02 (2006.01)

(52) U.S. Cl. ............... 345/589; 345/591; 345/603; 345/606; 348/179; 348/223.1; 382/162; 382/165; 382/167; 358/518; 358/538

(58) Field of Classification Search ........... 348/169, 348/174, 179–182, 207.1, 207.2, 208.11, 348/208.14, 222–223; 345/589–591, 597, 345/603, 606, 610, 618, 55, 77, 83–88; 358/504, 358/509, 515–519, 537–538; 382/162–167
See application file for complete search history.

(56) References Cited

U.S. PATENT DOCUMENTS

| | | | |
|---|---|---|---|
| 3,938,896 A | 2/1976 | Selgin | |
| 5,668,596 A * | 9/1997 | Vogel | 348/222.1 |
| 6,362,849 B1 | 3/2002 | Caisey-Bluteau et al. | |
| 6,614,530 B1 | 9/2003 | Duez et al. | |
| 6,856,354 B1 * | 2/2005 | Ohsawa | 348/370 |
| 2003/0020703 A1 * | 1/2003 | Holub | 345/207 |
| 2004/0001209 A1 * | 1/2004 | Chu et al. | 358/1.9 |
| 2004/0078299 A1 * | 4/2004 | Down-Logal et al. | 705/27 |
| 2004/0197020 A1 * | 10/2004 | Sones | 382/162 |
| 2004/0252303 A1 * | 12/2004 | Giorgianni et al. | 356/402 |

OTHER PUBLICATIONS

Jon Y. Hardebert, Francis Schmitt, Hans Brettel, "Multispectral image capture using a tunable filter," Ecole Nationale Supérieure des Télécommunications (Paris, France).

* cited by examiner

Primary Examiner—Wesner Sajous
(74) Attorney, Agent, or Firm—Hahn Loeser & Parks, LLP; David J. Muzilla

(57) ABSTRACT

A differential imaging colorimeter system and method which utilizes a RGB color camera to provide accurate differential colorimetry which can be employed as a portable, dedicated, offline system. The system utilizes a portable processor such as a laptop computer, a hand-held imaging head comprising a color camera, a lens, a plurality of white LED lights, a base plate defining an imaging region, housed in an opaque cover, wherein the imaging head provides a RGB video image to the portable processor; and a software program loaded on the portable processor for applying a geometric transform on an image obtained with the imaging head to match a stored reference image. The computer calculates differential colorimetry values to compare current images with a stored reference image.

20 Claims, 2 Drawing Sheets

DIFFERENTIAL IMAGING COLORIMETER

FIELD OF THE INVENTION

The present invention generally relates to calorimeters and, more particularly, to an imaging colorimeter system and method which utilizes an RGB color camera to provide accurate differential colorimetry which can be employed as a portable, dedicated, offline system.

BACKGROUND OF THE INVENTION

Manufacturers of color articles must employ quality assurance methods to ensure that the colors used in their products are consistent and match a production reference color, colors, or color patterns. These methods can be as simple as a production floor operator performing a set-up of a product run by making visual comparison of a finished set-up part to a standard reference color chart or reference colored part. Based on this comparison the operator makes adjustments to the color. Then another set-up part is created and compared, more adjustments made until acceptable results are achieved, and the product run is initiated. This subjective method may lead to errors because of differences in the ambient light conditions, positions of the inspection light source, and differences in surface textures between the color reference part and the finished part, different people conducting the comparisons, and other factors. While such a subjective comparison may be appropriate for some manufactured products, other more sophisticated color products may require more objective techniques. Examples of such products include wallpaper, flooring tiles, and other articles which may have more complex color schemes that are repeated or are placed next to each other in use. Besides merely color concerns, these complex color schemes may have spatial or pattern defects. A trained quality assurance color inspector using a standard illuminant may be able to catch many of these defects by using a subjective comparison with a standard reference part, however, many of such defects may not be discernible to the naked eye. In such applications, manufacturers have typically used a color densitometer, a tristimulus calorimeter, or a reflectance spectrophotometer to provide more precise color matching by utilizing colorimetry, discussed in more detail below.

The process of quantitative color analysis is generally referred to as colorimetry. Since the introduction of the CIE (Commission International de l'Eclairage) color measurement system in the early 1930's, many different measurement systems have been proposed for different applications. One such measurement system is the CIE XYZ color space. The CIE XYZ color space characterizes colors by a luminance parameter Y and two color coordinates X and Z which specify the point on the chromaticity diagram. The XYZ parameters are based on the spectral power distribution of the light emitted from a colored object and are factored by sensitivity curves which have been measured for the human eye. The human eye has three different types of color-sensitive cones. Accordingly, the XYZ functions were intended to correspond to the average sensitivity of the human eye and provide a device-independent representation of color. Therefore, the spectral responses of the XYZ functions are known as "tristimulus" functions and make up the coordinate system to quantify a color image or color space.

The apparent color of an object depends not only on its intrinsic spectral reflectivity, but also on the spectrum of the light used to illuminate it. The CIE also has defined a number of standard illuminants which are defined, theoretically, in terms of their spectral content. To completely specify the color of an object, one must measure the XYZ values of the light emanating from the object when it is illuminated by a standard illuminant.

Another CIE color space which is frequently used is the L*a*b* color space. The values of L*, a*, and b* are derived mathematically from the tristimulus values of X, Y, and Z:

$$L^* = 116\left(\frac{Y}{Y_n}\right)^{1/3} - 16$$

$$a^* = 500\left[\left(\frac{X}{X_n}\right)^{1/3} - \left(\frac{Y}{Y_n}\right)^{1/3}\right]$$

$$b^* = 200\left[\left(\frac{Y}{Y_n}\right)^{1/3} - \left(\frac{Z}{Z_n}\right)^{1/3}\right]$$

where the values with the subscript "n" are found in published tables and correspond to a chosen standard illuminant. The value of L* is proportional to the brightness (luminosity) of the color. The value of a* describes the red/green composition of the color. The value of b* describes the yellow/blue composition of the color.

The goal of the L*a*b* color space is to provide a color space where the Euclidean distance between color 1 and color 2

$$\Delta E = \sqrt{(\Delta L^*)^2 + (\Delta a^*)^2 + (\Delta b^*)^2}$$

wherein:

$\Delta L^* = L_1^* - L_2^*$ $\Delta a^* = a_1^* - a_2^*$ $\Delta b^* = b_1^* - b_2^*$ is a "perceptually uniform" measure of the difference between color 1 and color 2. A value of $\Delta E = 1$ corresponds to a color difference which is very subtle—so subtle that it would take a trained color observer working under ideal lighting conditions to notice the difference. A value of $\Delta E = 2$ corresponds to a difference in color which is twice as noticeable as $\Delta E = 1$, and so on. The "perceptual distance" denoted by a given value of $\Delta E$ is intended to be independent of the location in color space (that is, independent of hue, saturation, and brightness), but this independence is actually only an approximation. Regardless, $\Delta E$ has been accepted in the color industry to quantify color differences.

As stated above, manufacturers typically have used a tristimulus colorimeter, a reflectance spectrophotometer, or a color densitometer to provide more precise color matching by utilizing one or more color measurement systems. These instruments provide quantitative and objective feedback, but are slow and inconvenient, and only measure color at one small spot (typically 5 mm in diameter) at a time, making it inconvenient to impossible to use them to compare all the colors on a complex multi-color pattern. In addition, these devices tend to be expensive due to the manufacturing care necessary to construct a device capable of providing precise color measurements suitable for laboratory use. These disadvantages make these devices particularly unsuitable for the production floor for use in machine set-up. Another disadvantage with densitometers is that they do not provide absolute color metrics (such as XYZ tristimulous values). Instead, they report the overall reflectivity of a surface for red, green, and blue light. Color densitometers are only suited for relative (as opposed to absolute) measurements. These relative measurements are often sufficient when the goal is simply to determine if the color on one object "matches" the color on another object.

Therefore there remains a need in the art for a fast and convenient way to quantitatively and objectively compare colors between a standard reference and a set-up colored product at a number of different locations over a relatively large region. This will guide the operator/inspector in making appropriate adjustments to the production process, shorten set-up time, and improve the ultimate quality of the color production process.

SUMMARY OF THE INVENTION

The present invention overcomes at least one of the aforementioned disadvantages by providing a video inspection method comprising the steps of: acquiring a first image of a first object with a differential imaging colorimeter system; acquiring a second image of a second object with the differential imaging colorimeter system; applying a geometric transform to the second image to make the second image features correspond to features of the first image; using a color response function of the differential imaging colorimeter system to calculate the mean calorimetric coordinates of a predetermined portion of the first image; using the color response function of the differential imaging calorimeter system to calculate the mean colorimetric coordinates of a predetermined portion of the second image; and calculating differential colorimetric values to enable an objective determination of the similarity of the first object and the second object. These and other advantages are also provided by a differential imaging calorimeter system comprising: a portable processor comprising a video monitor and an input device; a hand-held imaging head comprising a color camera, a lens, a plurality of white LED lights, a base plate defining an imaging region, housed in an opaque cover, wherein the imaging head provides a RGB video image to the portable processor; and a software program loaded on the portable processor for applying a geometric transform on an image obtained with the imaging head to match a stored reference image.

BRIEF DESCRIPTION OF THE DRAWINGS

The invention and developments thereof are described in more detail in the following by way of embodiments with reference to the drawings, in which.

DETAILED DESCRIPTION

Absolute colorimetry values (such as XYZ or L*a*b*) obtained with a color camera are not highly accurate. However, the differences measured between two objects are more accurate, since systematic errors contained in the two measurements tend to cancel out. So it is possible to obtain commercially useful $\Delta L^*$, $\Delta a^*$, $\Delta b^*$ and $\Delta E$ values with a color camera. This is what is meant by the term "differential colorimetry".

Figure 1:
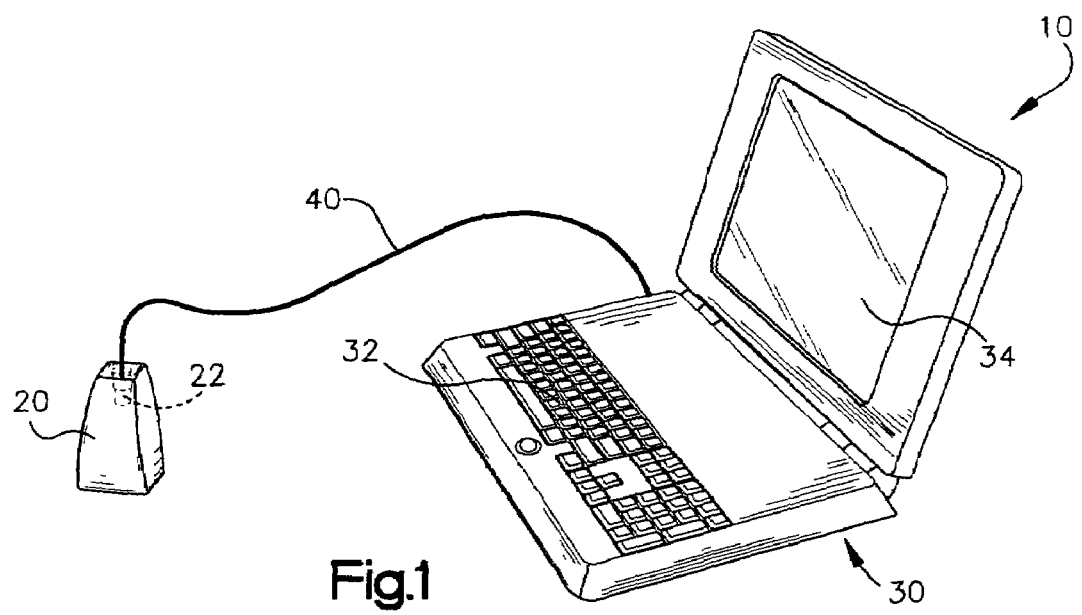
FIG. 1 shows a differential imaging colorimeter system which utilizes an imaging head having an RGB color camera employed as a portable, dedicated, offline system.

Referring now to FIG. 1, a differential imaging calorimeter system 10 comprises an imaging head 20 and a processing unit 30 typically in the form of a laptop computer having a keyboard/mouse 32 for commands and a display 34. A cable 40 typically connects the computer 30 to a camera 22 (see FIG. 2) in the imaging head 20. The camera 22 is a three-color camera providing RGB color signals in the form of analog or digital electrical signals. Examples of three-color cameras include: CCD video cameras—still cameras, CID video cameras—still cameras, etc. The computer 30 may include a frame grabber (not shown), for transforming analog RGB signals into an RGB digital image. If a digital three-color camera is used, a frame grabber may be unnecessary. The cable 40 is used to transmit control signals from the computer 30 to the imaging head 20, and to transmit image data from the camera 22 to the computer 30.

Figures 2A, 2B:
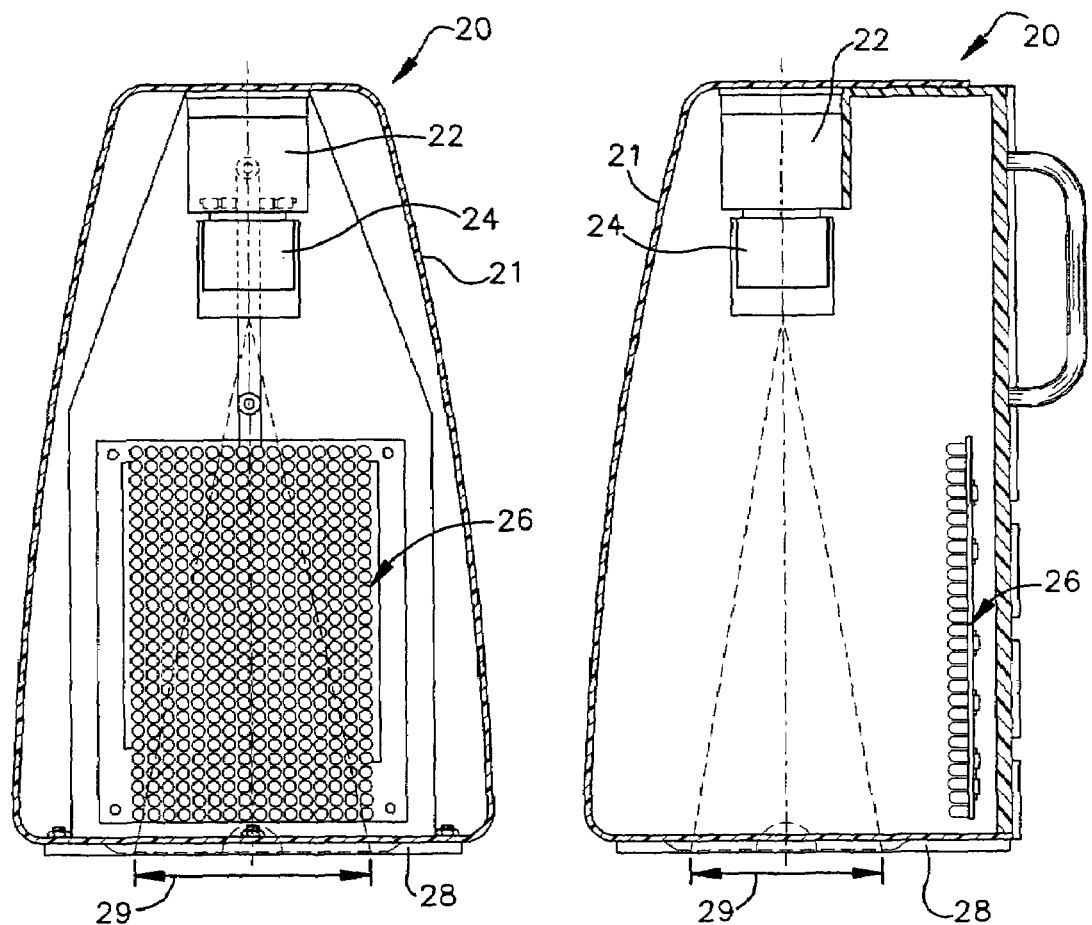
FIGS. 2A and 2B show cross-sectional views through the longitudinal axis of the imaging head of FIG. 1 wherein the cross-section of FIG. 2A is perpendicular to the cross-section of FIG. 2B.

As shown in FIG. 2, the imaging head 20 is a hand-held structure containing a color video camera 22 and lens 24, a white LED illumination panel and its attendant power and control circuitry 26, and a base plate 28 with an approximately 3×4 inch aperture defining the imaging region 29 (although the present invention is not limited to a particular size imaging region—an aspect of the invention is to provide the capability to analyze an area significantly larger than the 5 mm diameter spot of colorimeters and the like). These components are surrounded by an opaque plastic cover 21 which serves to protect the imaging components from mechanical damage and shield the system from ambient light. A portion of the inside of the cover may be painted white in order to reflect light from the LED panel 26 and, thereby, provide more uniform illumination of the imaging region 29. The camera 22 and lens 24 are positioned and adjusted so that the camera field of view is substantially coincident with the imaging region 29. A cable (not shown) supplying power to the LED panel runs from the LED panel to a DC power adapter plugged into a nearby AC power outlet. Another cable (not shown) runs from the camera 22 to the LED panel 26 and controls when the LED panel 26 is turned on.

The RGB values output by a real color camera do not exactly correspond to the XYZ values which would be output by an ideal tristimulus camera and, likewise, the spectrum of a real light source never precisely corresponds to a standard illuminant. However, it is possible to use a real color camera and a real light source and determine an approximate "best-fit" functional mapping from the camera's RGB values to ideal XYZ values. While the RGB-to-XYZ mapping is an approximation, the accuracy of the approximation is sufficient for practical color comparisons as in the present invention.

The best-fit functional mapping provides a color response function for the differential imaging calorimeter system 10. The mapping is determined based on an empirical calibration of the differential imaging colorimeter system 10. In particular, a color chart with known colors (that is, colors which have been carefully measured with a spectrophotometer or colorimeter) is imaged with the camera 22, and the RGB values of the color patches are extracted. Then a mathematical procedure, such as linear regression, is used to derive the best-fit mapping from RGB to XYZ, and vice versa. For example, the simple linear transform $$\begin{bmatrix} X \\ Y \\ Z \end{bmatrix} = V_0 + M \begin{bmatrix} R \\ G \\ B \end{bmatrix}, \text{ where } V_0 = \begin{bmatrix} X_0 \\ Y_0 \\ Z_0 \end{bmatrix} \text{ and } M = \begin{bmatrix} M_{00} & M_{01} & M_{02} \\ M_{10} & M_{11} & M_{12} \\ M_{20} & M_{21} & M_{22} \end{bmatrix}$$

has been found effective. The present invention is not intended to be limited to this particular transform, other transforms, such as those based on quadratic or cubic polynomials, could also be used. Here the subscripted constants are determined by linear regression from a number (typically twelve to twenty-four, but not limited to a particular number) of measured XYZ-to-RGB correspondences.

Figure 3:
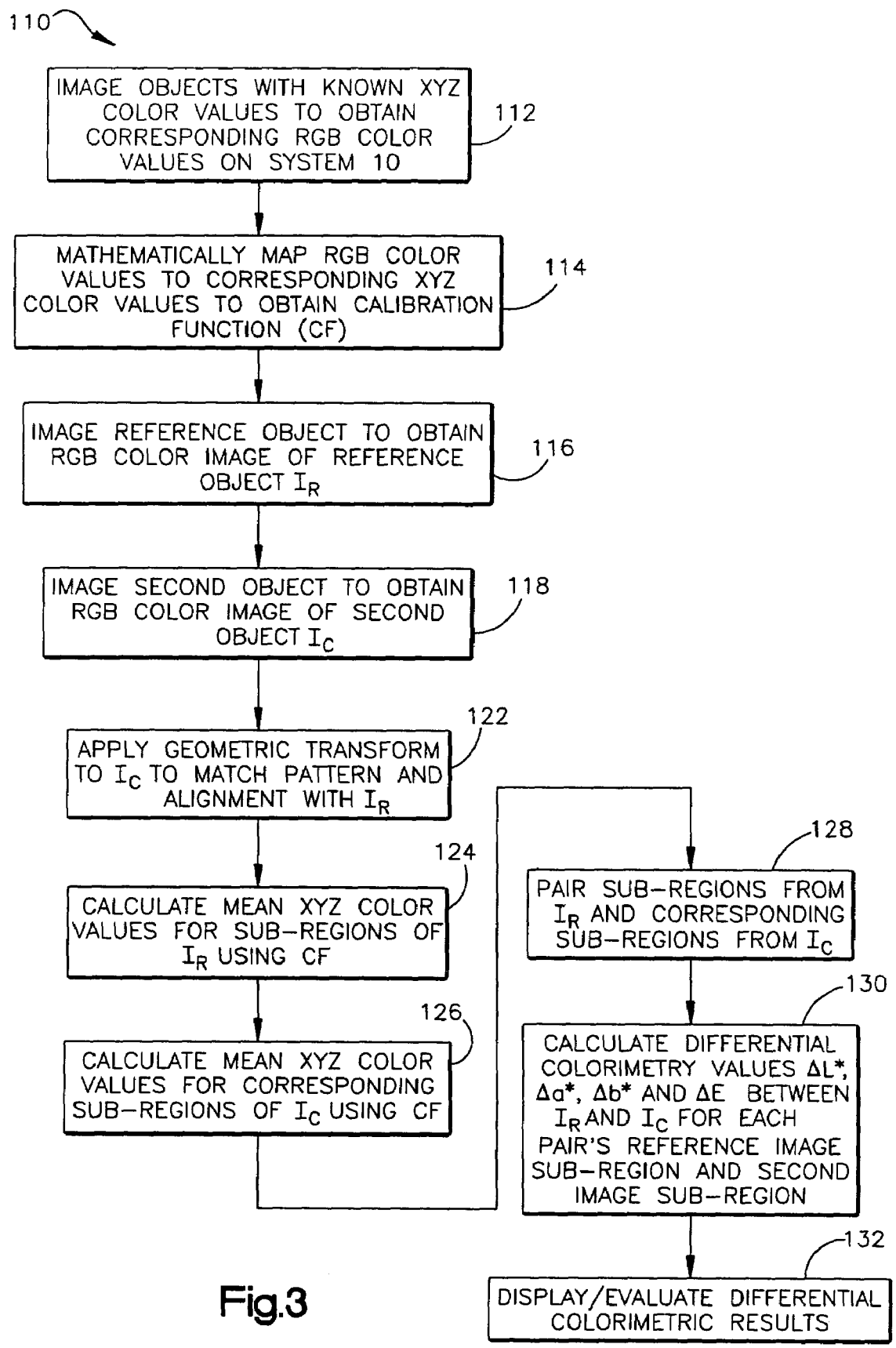
FIG. 3 shows a method of employing the differential imaging colorimeter system of FIG. 1.

Referring now to FIG. 3, the method 110 of the use of the differential imaging colorimeter system 10 is illustrated. System 10 has a color calibration chart having a number of color patches with known XYZ tristimulus values. The color calibration chart is imaged using imaging head 20 to obtain RGB values of each color patch 112. A calibration function CF is then obtained for the system 10 by mathematically mapping RGB color values to corresponding XYZ tristimulous values to obtain a calibration function CF 114. Once the system 10 has been calibrated and a color response function CF determined, the system is ready for use.

In operation, the imaging head 20 is first placed on the standard colored reference sheet (or standard colored reference part) supported by the base plate 28, with the imaging region 29 centered on the region of interest. The computer 30 is typically in continuous imaging mode at this time, so the operator can see on the computer screen 34 exactly where the imaging region 29 is located and adjust the position of the imaging head 20 accordingly. Once the desired position is obtained, the operator instructs the computer 30 to acquire a first image, or reference image $I_R$ 116. This reference image $I_R$ will be used for colorimetry comparisons with manufactured production sheets or parts. Accordingly, the operator places the imaging head 20 on the sheet which is to be inspected and compared to the standard reference sheet. Using continuous imaging mode, the operator positions the imaging head 20 over the same region of interest as was used for the reference image $I_R$ and the second image, referred to as the current image $I_C$ is acquired 118. The operator then instructs the computer 30 to compare the current image $I_C$ to the stored reference image $I_R$. The comparison may involve several different steps that are completed by the imaging software loaded in computer 30.

The first comparative step involves applying a geometric transform to the current image $I_C$ 122. The geometric transform involves software which can determine the exact location and orientation of a pattern in the current image $I_C$ with respect to the corresponding pattern in the reference image $I_R$. Once detected, the software is able to translate and rotate the current image $I_C$ so its pattern is precisely superimposed upon the corresponding pattern in the reference image $I_R$. This software feature makes hand-held operation of the differential imaging system 10 practical, since it means the reference image $I_R$ and current image $I_C$ do not need to be precisely aligned at the time of image acquisition. The software allows the user to view the output of the alignment on the monitor 34 while the system 10 is in continuous imaging mode and the imaging head 20 is being positioned, making it obvious when the pattern locator feature "locks onto" the reference pattern. These types of software packages for pattern identification and alignment correction are known in the machine vision industry, however, until now they have not been used with a differential calorimeter of the type of the present invention which can be employed as a portable, dedicated, offline system.

Once properly aligned by the software, the color response function CF is used to calculate the mean colorimetric coordinates of a set of sub-regions (user-predetermined regions of interest) of the reference image $I_R$ 124. The color response function CF is then used to calculate the mean colorimetric coordinates of a set of sub-regions of the current image $I_C$ 126, wherein the current image sub-region set is in geometrical correspondence with the first image sub-region set due to the application of the geometric transform. The first image sub-region is then paired with the geometrically corresponding second image sub-region 128. The software calculates the differential colorimetry values ($\Delta L^*$, $\Delta a^*$, $\Delta b^*$ and $\Delta E$) between the reference and the current images for each pair's reference image sub-regions and second image sub-regions 130. These values are displayed on the computer screen, and an out-of-tolerance indicator/alarm may be triggered based on predetermined pass/fail thresholds for these values 132.

It is also contemplated in the method of the present invention that differential colorimetry calculations may be performed at many different pattern locations (and with circular or rectangular regions of interest of any size) simultaneously.

Although the present invention has been described above in detail, the same is by way of illustration and example only and is not to be taken as a limitation on the present invention.

What is claimed is:

1. A video inspection method comprising the steps of:
   acquiring a first image of a first object with a differential imaging colorimeter system;
   acquiring a second image of a second object with the differential imaging colorimeter system;
   applying a geometric transform to the second image to make the second image features correspond to features of the first image;
   using a color response function of the differential imaging colorimeter system to calculate the mean colorimetric coordinates of a predetermined portion of the first image;
   using the color response function of the differential imaging colorimeter system to calculate the mean colorimetric coordinates of a predetermined portion of the second image; and
   calculating differential colorimetric values to enable an objective determination of the similarity of the first object and the second object.

2. The method of claim 1, wherein the step of applying a geometric transform to the second image comprises the step of matching a pattern from the first image to a pattern on the second image.

3. The method of claim 1, wherein the step of applying a geometric transform to the second image comprises the step of rotating and translating the second image to match the first image.

4. The method of claim 1 further comprising the step of determining the color response function for the differential imaging colorimeter.

5. The method of claim 4, wherein the step of determining a color response function for the differential imaging colorimeter comprises the steps of:
   imaging a first plurality of objects having known colorimetric color values using a video camera to obtain a first corresponding plurality of video color values;

using a mathematical mapping function to approximate the best fit between the video and colorimetric color values.

6. The method of claim 5, wherein the step of using a mathematical mapping function comprises the step of using linear regression to develop a linear transform between the video and colorimetric color spaces.

7. The method of claim 5, wherein the step of using a mathematical mapping function to approximate the best fit between the video and colorimetric color values is accomplished by using linear regression to develop a linear transform utilizing a 3×3 matrix and an offset vector.

8. The method of claim 1, wherein the step of calculating differential colorimetric values comprises the step of calculating $\Delta L^*$, $\Delta a^*$, $\Delta b^*$ based on the mean colorimetric coordinates of the predetermined portion of the first image and the mean colorimetric coordinates of the predetermined portion of the second image to obtain a $\Delta E$ value.

9. A video inspection method comprising the steps of:
determining a color response function for a differential imaging colorimeter system,
acquiring a first video image of a reference object using the differential imaging colorimeter system,
acquiring a second video image of a second object using the differential imaging colorimeter system;
applying a geometric transform to the second image;
using the color response function to calculate the mean colorimetric coordinates of a sub-region of the first video image;
using the color response function to calculate the mean colorimetric coordinates of a corresponding sub-region of the second image, and
calculating differential colorimetric values to make a comparison of the similarity of the sub-region of the first video image and the corresponding sub-region of the second video image.

10. The method of claim 9, wherein the step of applying a geometric transform to the second image comprises the step of matching a pattern from the first image to a pattern on the second image.

11. The method of claim 9, wherein the step of applying a geometric transform to the second image comprises the step of rotating and translating the second image to match the first image.

12. A video inspection method comprising the steps of:
performing a calibration of a differential imaging colorimeter system resulting in a mathematical mapping function between video and colorimetric color spaces;
acquiring a first video image of a first object;
acquiring a second video image of a second object;
applying a geometric transform to the second image to make the second image geometrically correspond to the features of the first image;
using the mathematical mapping function to calculate the mean colorimetric coordinates of predetermined portions of the first and second video images,
pairing portions of the first image with corresponding portions of the second image;
calculating the differential colorimetric values from the calculated mean colorimetric coordinates for each paired portion;
using the calculated differential colorimetric values to judge the similarity of the first and second objects.

13. The method of claim 12, wherein the step of applying a geometric transform to the second image comprises the step of matching a pattern from the first image to a pattern on the second image.

14. The method of claim 12, wherein the step of applying a geometric transform to the second image comprises the step of rotating and translating the second image to match the first image.

15. A differential imaging colorimeter system comprising:
a portable processor comprising a video monitor and an input device;
a hand-held imaging head comprising a color camera, a lens, a plurality of white LED lights, a base plate defining an imaging region, housed in an opaque cover, wherein the imaging head provides a RGB video image to the portable processor; and
a software program loaded on the portable processor for applying a geometric transform on an image obtained with the imaging head to match a stored reference image.

16. The differential imaging colorimeter system of claim 15, wherein geometric transform software program comprises a pattern matching system.

17. The differential imaging colorimeter system of claim 15, wherein the geometric transform software program comprises the ability to translate and rotate an image.

18. The differential imaging colorimeter system of claim 15 further comprising the means for calculating differential colorimetry values between the image obtained with the imaging head and the stored reference image.

19. The differential imaging colorimeter system of claim 15, wherein the color camera is a digital color video camera.

20. The differential imaging colorimeter system of claim 15, wherein the interior of the opaque cover of the imaging head is white.

* * * * *